US011237855B2

(12) United States Patent
Kobayashi

(10) Patent No.: US 11,237,855 B2
(45) Date of Patent: Feb. 1, 2022

(54) ENGINEERING SYSTEM AND ENGINEERING METHOD THAT USE CLOUD ENVIRONMENT

(71) Applicant: YOKOGAWA ELECTRIC CORPORATION, Musashino (JP)

(72) Inventor: Toshiko Kobayashi, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/581,806

(22) Filed: Sep. 25, 2019

(65) Prior Publication Data

US 2020/0103842 A1  Apr. 2, 2020

(30) Foreign Application Priority Data

Sep. 27, 2018 (JP) .............................. JP2018-182604

(51) Int. Cl.
| | |
|---|---|
| *G06F 9/455* | (2018.01) |
| *G05B 19/042* | (2006.01) |
| *G06F 11/36* | (2006.01) |
| *G06F 8/60* | (2018.01) |

(52) U.S. Cl.
CPC ......... *G06F 9/455* (2013.01); *G05B 19/0426* (2013.01); *G06F 8/60* (2013.01); *G06F 11/3648* (2013.01); *G05B 2219/23008* (2013.01)

(58) Field of Classification Search
None
See application file for complete search history.

(56) References Cited

U.S. PATENT DOCUMENTS

| | | | |
|---|---|---|---|
| 6,901,581 B1* | 5/2005 | Schneider ........... | G06F 11/3636 714/E11.212 |
| 2002/0120921 A1* | 8/2002 | Coburn ............ | G05B 19/41885 717/140 |
| 2003/0182083 A1* | 9/2003 | Schwenke .......... | G05B 23/0216 702/183 |
| 2003/0192032 A1* | 10/2003 | Andrade ............... | G06F 11/273 717/124 |
| 2012/0167044 A1* | 6/2012 | Fortier ................ | G06F 9/45529 717/121 |
| 2013/0016399 A1* | 1/2013 | Kobayashi ............ | G06F 3/1231 358/1.16 |
| 2013/0191106 A1* | 7/2013 | Kephart .................. | G06F 30/20 703/21 |
| 2013/0218307 A1* | 8/2013 | Hoernicke ......... | G05B 19/0426 700/81 |
| 2015/0012118 A1* | 1/2015 | G ........................... | G05B 15/02 700/17 |
| 2018/0120823 A1* | 5/2018 | Murata ............. | G05B 19/0428 |

FOREIGN PATENT DOCUMENTS

WO    WO2013/098626 A1    7/2013

* cited by examiner

*Primary Examiner* — Qing Chen
(74) *Attorney, Agent, or Firm* — Westerman, Hattori, Daniels & Adrian, LLP

(57) ABSTRACT

An engineering system includes a cloud. The cloud includes an engineering tool and a virtual device. The engineering tool is configured to create and debug software for operating a control device that controls a field device installed in a plant. The virtual device is configured to simulate an operation state of the control device in accordance with the software and with simulated input or input to the control device. The engineering tool debugs the software based on an operation result of the virtual device and on output from the control device or the simulated input.

6 Claims, 8 Drawing Sheets

ENGINEERING SYSTEM AND ENGINEERING METHOD THAT USE CLOUD ENVIRONMENT

CROSS-REFERENCE TO RELATED APPLICATION

The present application claims priority to and the benefit of Japanese Patent Application No. 2018-182604 filed Sep. 27, 2018, the entire contents of which are incorporated herein by reference.

TECHNICAL FIELD

The present disclosure relates to an engineering system and an engineering method.

BACKGROUND

Systems for performing engineering, such as design, maintenance, and troubleshooting, in a variety of industrial automation systems are known. For example, see patent literature (PTL) 1.

CITATION LIST

Patent Literature

PTL 1: WO2013/098626

SUMMARY

An engineering system according to an embodiment includes a cloud. The cloud includes an engineering tool and a virtual device. The engineering tool is configured to create and debug software for operating a control device that controls a field device installed in a plant. The virtual device is configured to simulate an operation state of the control device in accordance with the software and with simulated input or input to the control device. The engineering tool debugs the software based on an operation result of the virtual device and on output from the control device or the simulated input.

An engineering method according to an embodiment is an engineering method to be executed by an engineering system including a cloud that includes an engineering tool and a virtual device. The engineering method includes creating and debugging software, using the engineering tool, for operating a control device that controls a field device installed in a plant, and simulating, using the virtual device, an operation state of the control device in accordance with the software and with simulated input or input to the control device. The engineering tool debugs the software based on an operation result of the virtual device and on output from the control device or the simulated input.

BRIEF DESCRIPTION OF THC DRAWINGS

DETAILED DESCRIPTION

Figure 1:
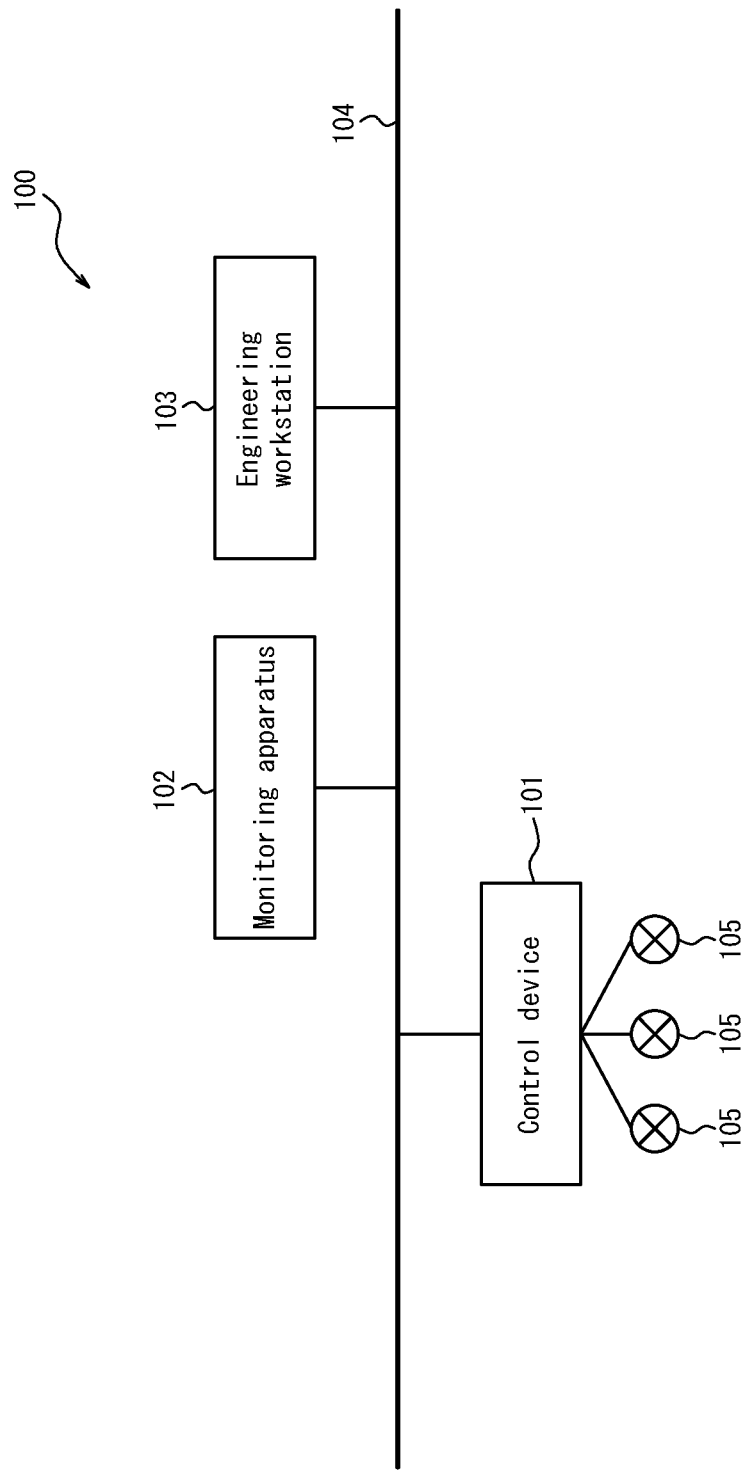
FIG. 1 is a schematic diagram illustrating an example engineering system.

The system disclosed in PTL 1 can remotely perform engineering using a cloud. It would be advantageous, however, to provide high-quality engineering that more effectively uses the cloud.

It is an object of the present disclosure to provide an engineering system and an engineering method that can provide high-quality engineering.

An engineering system according to an embodiment includes a cloud. The cloud includes an engineering tool and a virtual device. The engineering tool is configured to create and debug software for operating a control device that controls a field device installed in a plant. The virtual device is configured to simulate an operation state of the control device in accordance with the software and with simulated input or input to the control device. The engineering tool debugs the software based on an operation result of the virtual device and on output from the control device or the simulated input. With this configuration, the engineering system allows debugging to be performed using not only simulated input but also data related to a state of control by the control device that actually uses the software. The engineering system therefore allows debugging that is more appropriate for the actual use environment. In this way, the engineering system can provide high-quality engineering.

In an embodiment of the engineering system, the software may be downloaded onto the control device when the engineering tool finishes debugging the software. The control device can thereby perform control using debugged software, which can reduce the probability of erroneous control.

In an embodiment of the engineering system, the software may be downloaded via a local engineering station. The engineering tool can therefore download the created software onto a local engineering station, regardless of whether the plant where the control device is being used is suspended.

In an embodiment, the engineering system may include two or more pairs of the control device and the engineering tool. High-quality engineering can therefore also be provided in a distributed engineering system.

An engineering method according to an embodiment is an engineering method to be executed by an engineering system including a cloud that includes an engineering tool and a virtual device. The engineering method includes creating and debugging software, using the engineering tool, for operating a control device that controls a field device installed in a plant, and simulating, using the virtual device, an operation state of the control device in accordance with the software and with simulated input or input to the control device. The engineering tool debugs the software based on an operation result of the virtual device and on output from the control device or the simulated input. With this configuration, the engineering system allows debugging using not only simulated input but also data related to a state of control by the control device that actually uses the software. The engineering system therefore allows debugging that is more appropriate for the actual use environment. In this way, the engineering method can provide high-quality engineering.

The present disclosure can provide an engineering system and an engineering method that can provide high-quality engineering.

Embodiments of the present disclosure are now described with reference to the drawings.

First, an example of an engineering system is described with reference to FIG. 1 through FIG. 3.

FIG. 1 is a schematic diagram illustrating an example engineering system. The engineering system 100 illustrated in FIG. 1 includes a control device 101, a monitoring apparatus 102, and an engineering workstation (EWS) 103. The control device 101, the monitoring apparatus 102, and the EWS 103 may each be configured by a computer, such as a server. The control device 101, the monitoring apparatus 102, and the EWS 103 are connected to a network 104 and are capable of communicating with each other.

The control device 101 controls controlled devices 105 by executing predetermined software. In the present disclosure, the software is to be understood as including both an operating system (OS) and applications running on the OS, for example. The software executed on the control device 101 is created using the EWS 103.

The controlled device 105 is a field device used in a plant. Examples of the field device include sensor devices such as pressure gauges, flow meters, and temperature sensors; valve devices, such as flow control valves and opening/closing valves; actuators, such as fans or motors; image capturing devices, such as cameras and video recorders, that capture images of the conditions and objects in the plant; acoustic devices, such as microphones that collect abnormal noises and the like inside the plant and speakers that emit warning sounds or the like; position detectors that output position information of various devices; and other such devices. Examples of the plant include an industrial plant such as a chemical plant; a plant for managing a well site, such as a gas field or oil field, and the surrounding area; a plant for managing power generation such as hydroelectric power, thermal power, nuclear power, or the like; a plant for managing environmental power generation such as solar power, wind power, or the like; and a plant for managing water and sewage, a dam, or the like. Three controlled devices 105 are illustrated in FIG. 1, but the number of controlled devices 105 is not limited to three and may be any appropriate number.

The controlled devices 105 are communicably connected to the control device 101. The controlled devices 105 may, for example, include a sensor device, a valve device, and/or an actuator device. The control device 101 may control the valve device and/or actuator device in accordance with software in response to input from the sensor device. In this way, the control device 101 can control a predetermined section of the plant.

The control device 101 may, for example, acquire various data from the sensor device connected communicably to the control device 101. In other words, the control device 101 receives input from the sensor device. An appropriate number of sensor devices may be arranged at appropriate positions within the plant in which the controlled devices 105 are installed. The control device 101 may execute software to output a signal for controlling the controlled devices 105 based on data acquired from the sensor device (acquired data). The control device 101 controls the controlled devices 105 by outputting this signal. For example, the control content of the controlled devices 105 is specified in accordance with the acquired data in the software executed by the control device 101. The control device 101 outputs a signal corresponding to input by executing the software.

The monitoring apparatus 102 monitors control by the control device 101. For example, the monitoring apparatus 102 acquires the acquired data from the control device 101 and collects (stores) the acquired data. The monitoring apparatus 102 executes a predetermined calculation process on the collected acquired data and displays the result of the calculation process on a display, for example. An engineer, for example, can learn the state of control by the control device 101 by viewing the display.

The EWS 103 is a workstation for creating software executed on the control device 101. The software created on the EWS 103 may, for example, specify the control content of the controlled devices 105 corresponding to the acquired data, as described above.

Debugging is performed on the EWS 103 to check for bugs (defects) in the created software. Specifically, an engineer provides simulated input on the EWS 103 to confirm whether the created software operates as designed. When the output corresponding to the simulated input differs from the design, the software is judged to have a bug and is modified to resolve the bug. When the debugging ends and the engineer judges that creation of the software on the EWS 103 is complete, the software created on the EWS 103 is downloaded onto the control device 101. The control device 101 then controls the controlled devices 105 by executing the downloaded software.

After the software is downloaded onto the control device 101 and control of the controlled devices 105 begins, an error could occur during control by the control device 101. In this case, the engineer uses the EWS 103 to identify the bug that was the source of the erroneous control and modify the software to resolve the bug.

Figure 2:
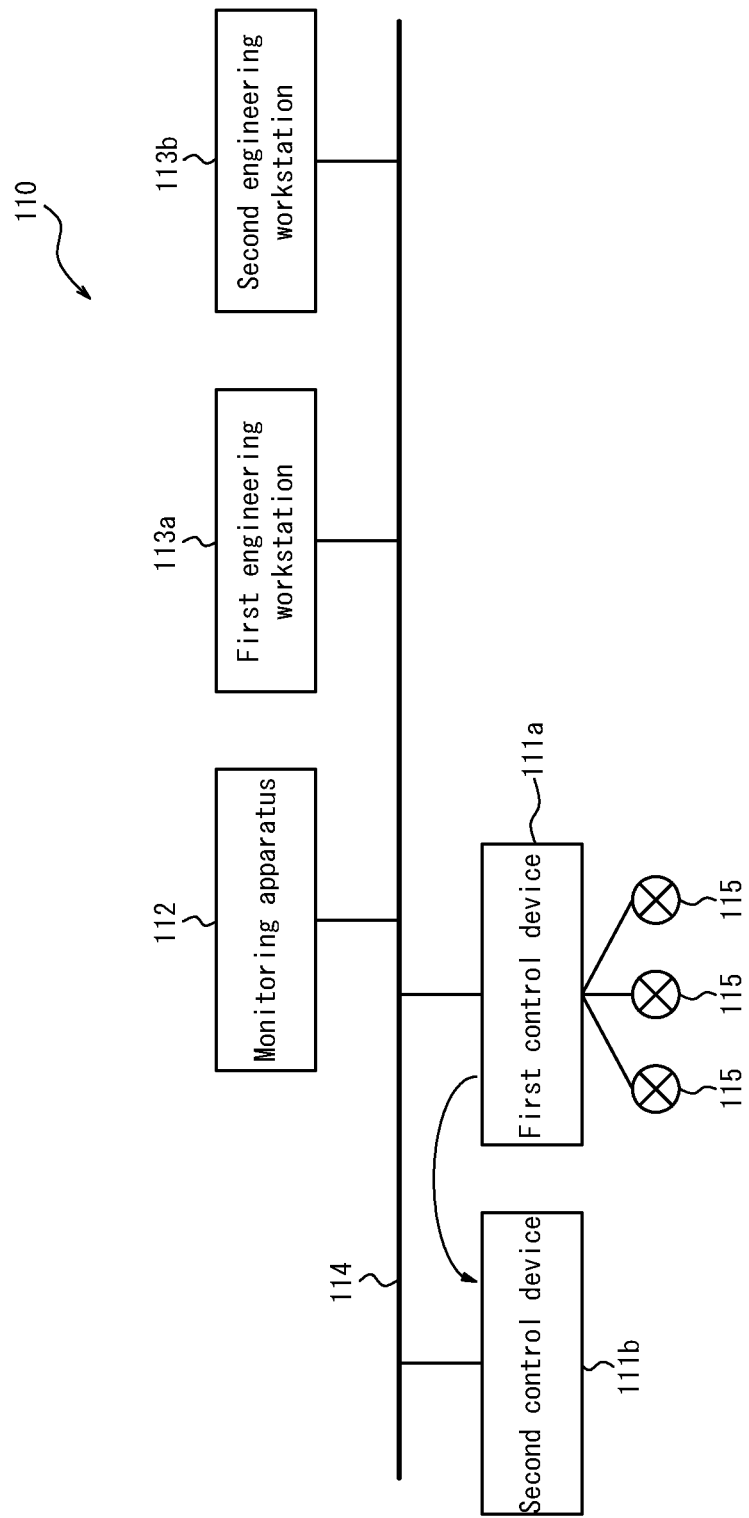
FIG. 2 is a schematic diagram illustrating an example of migration in an engineering system.

FIG. 2 is a schematic diagram illustrating an example of migration in an engineering system. In other words, FIG. 2 schematically illustrates an example of switching from an old system to a new system.

The engineering system 110 illustrated in FIG. 2 includes a first control device 111a, a second control device 111b, a monitoring apparatus 112, a first EWS 113a, and a second EWS 113b. It is assumed that the system is switched from a first engineering system in which controlled devices 115 are controlled by the first control device 111a using software created on the first EWS 113a to a second engineering system in which the controlled devices 115 are controlled by the second control device 111b using software created on the second EWS 113b.

The functions and configuration of the first control device 111a and second control device 111b, the monitoring apparatus 112, and the first EWS 113a and second EWS 113b illustrated in FIG. 2 may be respectively similar to those of the control device 101, the monitoring apparatus 102, and the EWS 103 described with reference to FIG. 1. FIG. 2 illustrates the state when the engineering system is being switched. The first control device 111a, the second control device 111b, the monitoring apparatus 112, the first EWS 113a, and the second EWS 113b are connected to a network 114 in FIG. 2 and are capable of communicating with each other.

The first engineering system is used before the engineering system is switched, and as illustrated in FIG. 2, the controlled devices 115 are controlled by the first control device 111a. When the engineering system is to be switched, the post-switching second engineering system is installed while the pre-switching first engineering system is being used, for example. In other words, the second control device 111b and the second EWS 113b that form the second engineering system are connected to the network 114 over which the first engineering system is installed. Operations of the plant to which the first engineering system is being applied are then suspended. At this time, the engineering system is switched to the second engineering system, and when plant operations restart, control is performed by the second engineering system. In other words, the controlled devices 115 are controlled by the second control device 111b of the second engineering system after the engineering system is switched.

Figure 3:
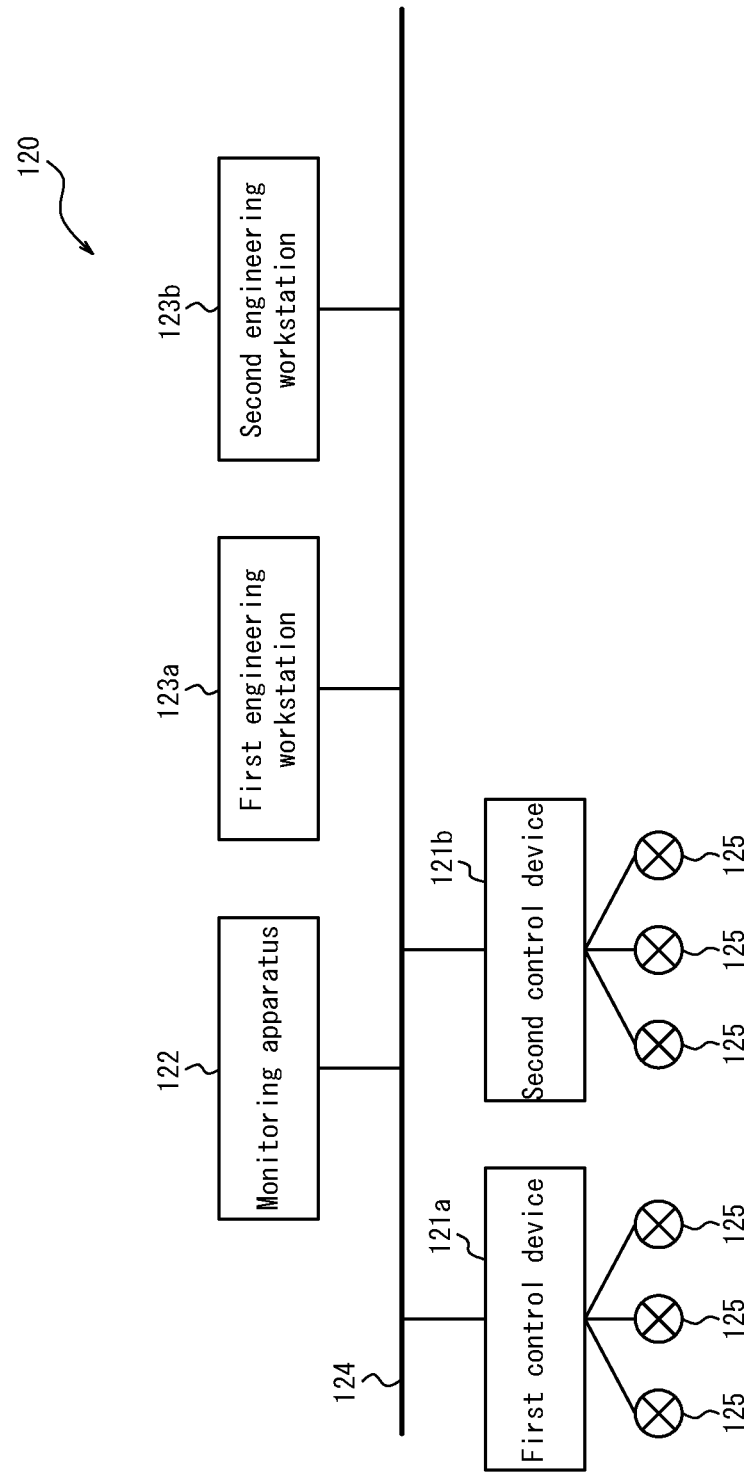
FIG. 3 is a schematic diagram illustrating another example engineering system.

FIG. 3 is a schematic diagram illustrating another example engineering system. Specifically, FIG. 3 schematically illustrates an example of a distributed engineering system.

The engineering system 120 illustrated in FIG. 3 includes a first control device 121a, a second control device 121b, a monitoring apparatus 122, a first EWS 123a, and a second EWS 123b. The first control device 121a, the second control device 121b, the monitoring apparatus 122, the first EWS 123a, and the second EWS 123b are connected to a network 124 and are capable of communicating with each other.

In the distributed engineering system 120, the first control device 121a and the second control device 121b each control a plurality of controlled devices 125. The plurality of controlled devices 125 controlled by the first control device 121a and the plurality of controlled devices 125 controlled by the second control device 121b may be the same in the distributed engineering system 120. The content of control by the first control device 121a and the content of control by the second control device 121b, however, may differ. In other words, the first control device 121a and the second control device 121b may each perform different control on equipment that includes a plurality of controlled devices 125 capable of providing the same functions. Such a distributed engineering system 120 is, for example, used in control of mining equipment at oil wells in an oil field. Each oil well in an oil field has different characteristics, and different control may need to be performed. In such a case, use of the distributed engineering system 120 illustrated in FIG. 3 allows appropriate control to be performed more easily on the equipment used in each oil well.

The software to be executed by the first control device 121a is created on the first EWS 123a, and the software to be executed by the second control device 121b is created on the second EWS 123b. Accordingly, the first control device 121a downloads and executes the software created on the first EWS 123a, and the second control device 121b downloads and executes the software created on the second EWS 123b. It is not necessary, however, that the software executed by the first control device 121a and the software executed by the second control device 121b in the distributed engineering system 120 be created on different EWSs. For example, the software executed by the first control device 121a and the software executed by the second control device 121b may both be created on one EWS. In this case, the one EWS creates both the software used by the first control device 121a and the software used by the second control device 121b.

The functions and configuration of the monitoring apparatus 122 of the distributed engineering system 120 illustrated in FIG. 3 may be similar to those of the monitoring apparatus 102 described with reference to FIG. 1.

The distributed engineering system 120 illustrated in FIG. 3 has been described as including two control devices, i.e. the first control device 121a and the second control device 121b. The number of control devices included in the distributed engineering system 120, however, may be appropriately determined in accordance with the environment in which the engineering system 120 is used, the equipment, and the like.

The software created on the EWS is downloaded onto the control devices in an engineering system such as the one in the above-described examples. To maintain the software environment, for example, the EWS subsequently remains installed at the site where the engineering system is used. Management and maintenance of the EWS installed at the site become problematic in this case. Despite the EWS being installed at the site to maintain the software environment, the EWS is not used if no problems occur, such as erroneous control during control by the control device. Conversely, if a problem does occur during control by the control device, for example, the EWS is used to resolve the problem. The EWS is a personal computer, however, and therefore cannot be connected to the system immediately after being turned on. Maintenance must also be performed as needed, such as taking security measures.

When a problem occurs during control by the control device, a computer is used to recreate the environment of the site with software and perform a simulation related to the state of control in order to identify the source of the problem and resolve the problem. The environment of the device at the site needs to be created on the computer at this time. However, if the computer or software revision, for example, differs from the device or software revision used at the actual site, it may be difficult to recreate the environment of the site on the computer.

It is also difficult to identify the data that caused the problem, even if the environment of the site can be recreated on the computer. To confirm the data indicating a problematic control state, an engineer therefore needs to visit the site where the engineering system is being used, for example, and wait at the site until the problem occurs. Furthermore, even if the problem actually occurs and the engineer can confirm the control state at that time, the engineer dispatched to the site might not be sufficiently skilled to resolve the problem that occurred, for example due to a lack of knowledge about how to address the problem. When the engineer does take steps to resolve the problem, tests still need to be run using the modified software, for example to confirm that execution of the modified software does not affect other areas in which no problem had occurred. The engineer thus needs to remain at the site until the tests are complete.

When the engineering system is to be switched, the post-switching second engineering system is installed while the pre-switching first engineering system is being used, as described with reference to FIG. 2. The types of devices used in the post-switching second engineering system need to be set, the network environment needs to be changed, and so forth. Complicated operations thus need to be performed to switch the engineering system.

The engineering system is switched while operations of the plant are suspended, but a long-term suspension period is normally not secured. This makes it difficult to secure time for sufficient debugging related to control by the post-switching engineering system. Furthermore, actual data related to control during operation of the plant cannot be acquired, since the plant is not operating while suspended. Debugging must therefore be performed using virtual input. With virtual input, however, it is difficult to completely cover the states that could occur during plant operations. If not all of the states can be anticipated, sufficient debugging cannot be performed.

In the distributed engineering system described with reference to FIG. 3, the plurality of control devices each include different software. This makes it necessary to manage each of the control devices, and management tends to become complicated.

In the present disclosure, an engineering system that uses a cloud environment to solve the problems in the engineering system described with reference to FIGS. 1 to 3 is described below.

First Embodiment

Figure 4:
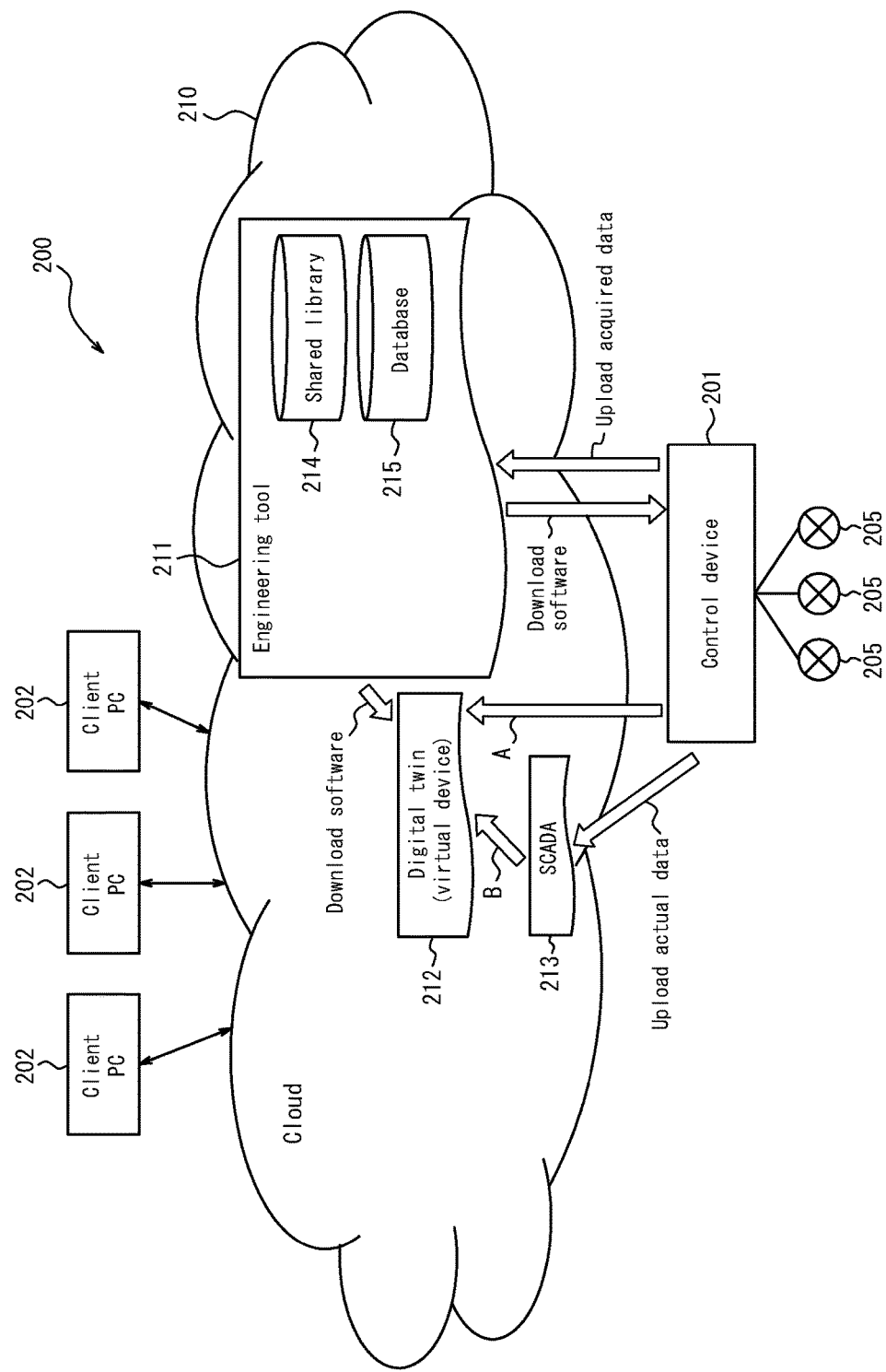
FIG. 4 is a schematic diagram illustrating an example engineering system according to a first embodiment.

FIG. 4 is a schematic diagram illustrating an example engineering system according to a first embodiment. The engineering system 200 illustrated in FIG. 4 includes a control device 201, a plurality of client PCs 202, and a cloud 210. The control device 201 and the client PCs 202 are configured to be capable of communicating with the cloud 210 over a network.

The functions and configuration of the control device 201 are similar to those of the control device 101 described with reference to FIG. 1. In other words, the control device 201 controls controlled devices 205 by executing predetermined software. The software executed by the control device 201 is created using an engineering tool 211 constructed on the cloud 210. The functions and configuration of the controlled devices 205 are similar to those of the controlled devices 105 described with reference to FIG. 1.

In the present embodiment, the control device 201 transmits (uploads) data acquired from a sensor device to the engineering tool 211 on the cloud 210. The control device 201 transmits actual data related to the control state of the controlled devices 205 in real time to a digital twin 212 or a supervisory control and data acquisition (SCADA) system 213, described below, on the cloud 210. The control device 201 may transmit simulated input to the digital twin 212 or the SCADA 213 along with or instead of the actual data. The actual data may, for example, include the data acquired by the sensor device and inputted to the control device 201 and information related to a signal outputted from the control device 201 to the sensor device.

The plurality of client PCs 202 are, for example, each configured by a personal computer or the like used by an engineer. The engineer can perform engineering with the engineering tool 211 by accessing the engineering tool 211 on the cloud 210 from one of the client PCs 202. In other words, by providing input to the client PC 202, the engineer can use the engineering tool 211 to create software to be executed on the control device 201. Three client PCs 202 are illustrated in FIG. 4, but the number of client PCs 202 is not limited to three and may be any appropriately determined number.

The cloud 210 includes the engineering tool 211, the digital twin 212, and the SCADA 213 constructed on the cloud 210.

The engineering tool 211 creates software to be executed by the control device 201. With regard to this point, the engineering tool 211 has a function corresponding to the EWS 103 in the engineering system 100 described with reference to FIG. 1. The engineering tool 211 executes software creation processing based on signals acquired from the client PC 202.

As illustrated in FIG. 4, for example, the engineering tool 211 includes a shared library 214 and a database 215. Various programs executed on the engineering tool 211, for example, are stored in the shared library 214. Acquired data that is uploaded from the control device 201, for example, is stored in the database 215.

The digital twin 212 is software recreating the control device 201 on the cloud 210. In other words, the digital twin 212 is a virtual device reproducing the control state of the control device 201 in a virtual environment. The digital twin 212 can be constructed using a known modeling technique, for example. The digital twin 212 simulates the operating state of the control device 201 in accordance with actual data and software downloaded onto the digital twin 212, for example. The actual data used in this case may be acquired data inputted to the control device 201.

The SCADA 213 is a system for monitoring control performed by the control device 201. Actual data related to control by the control device 201 is uploaded to the SCADA 213 in real time. By monitoring the uploaded actual data, the SCADA 213 monitors whether control by the control device 201 is being executed normally.

Figure 5:
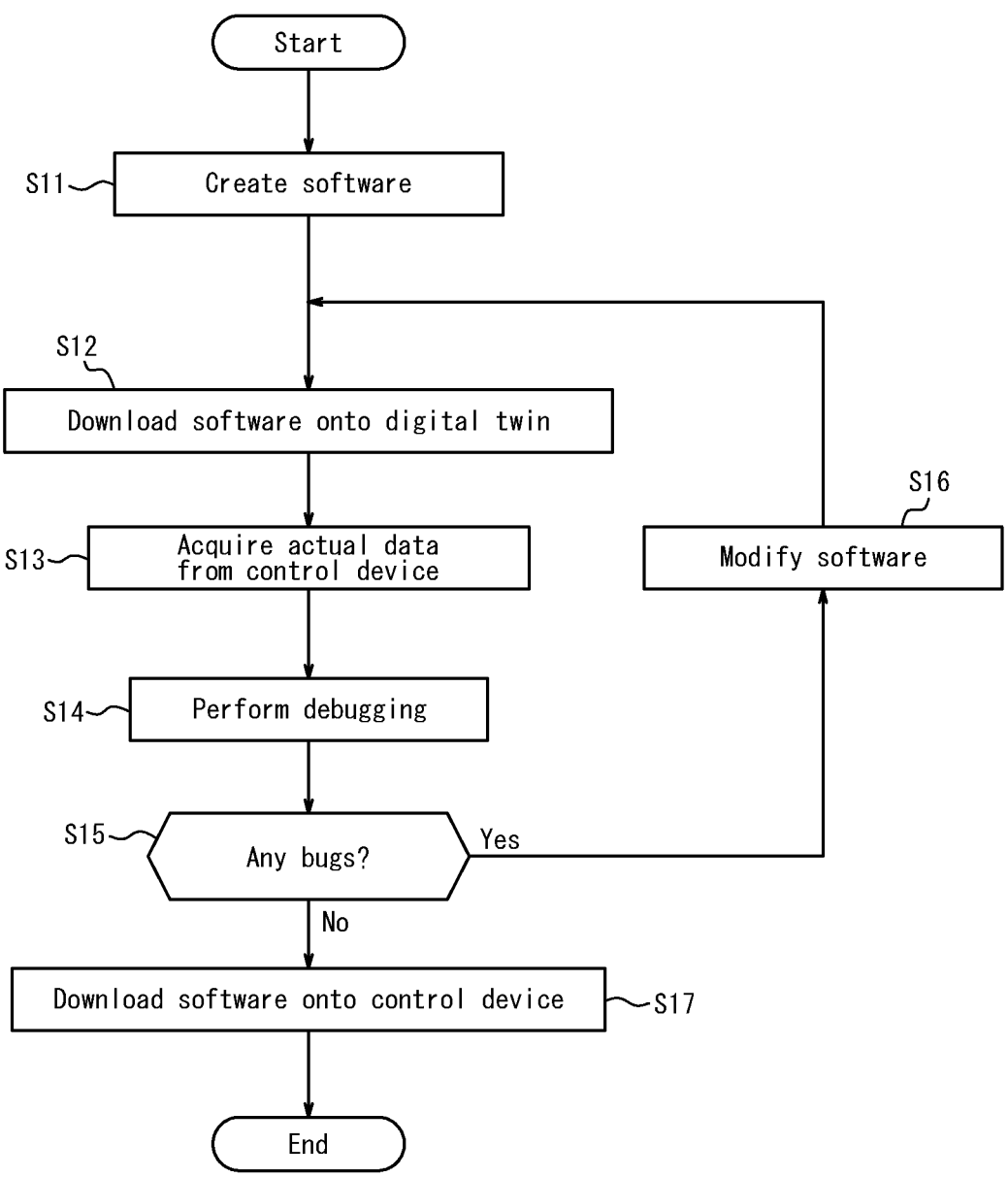
FIG. 5 is a flowchart illustrating an example of processing executed by the engineering system of FIG. 4.

Next, an example of a process (engineering method) executed on the engineering system 200 is described with reference to FIG. 5.

In the engineering system 200, software to be used by the control device 201 is first created with the engineering tool 211 on the cloud 210 (step S11). The engineering tool 211 creates the software based on a signal or simulated input transmitted from the client PC 202 in response to input operations by an engineer, for example.

The software created by the engineering tool 211 in step S11 is downloaded onto the digital twin 212 that recreates the control device 201 (step S12).

The digital twin 212 acquires the actual data from the control device 201 (step S13). The digital twin 212 may, for example, directly acquire actual data uploaded from the control device 201, as indicated by arrow A in FIG. 4, or acquire actual data via the SCADA 213, as indicated by arrow B in FIG. 4. Also, the digital twin 212 may use internal simulated data.

Debugging is then performed on the digital twin 212 (step S14). Specifically, the digital twin 212 first uses the actual data acquired in step S13 to execute the software downloaded in step S12. The digital twin 212 then performs debugging based on simulation results obtained by executing the software and based on the actual data. The actual data used in this case may be the output (a signal) from the control device 201. In other words, the digital twin 212 can perform debugging by comparing the operation results yielded by the simulation with the output from the control device 201. Actual data related to the control state of the controlled devices 205 controlled by the control device 201 can thus be used to debug the created software on the cloud 210 in the engineering system 200. In other words, a simulation of the created software is performed on the cloud 210. The debugging is performed over a period allowing determination of whether the software has a bug. This period allowing determination of whether the software has a bug may, for example, be set appropriately in accordance with the specifications and the like of the controlled devices 205 controlled by the control device 201.

The engineering tool 211 determines whether a bug is present from the results of debugging in step S14 (step S15).

When a bug is determined to be present (step S15: Yes), the created software is modified on the engineering tool 211 (step S16). In this case, the modified software is downloaded onto the digital twin 212 (step S12), and debugging using the modified software is performed. The software is repeatedly modified until being determined not to contain bugs.

Debugging ends when the software is determined not to contain bugs (step S15: No). In this case, the software created on the engineering tool 211 is, for example, downloaded onto the control device 201 from the engineering tool 211 while the plant is suspended (step S17). The downloaded software is then executed by the control device 201, and the controlled devices 205 are controlled.

After the software created by the engineering tool 211 is downloaded by the control device 201 and control of the controlled devices 205 using the software begins, an error could occur during control by the control device 101. In this case, the engineer uses actual data from when the erroneous control occurred to perform a simulation using the digital twin 212 on the cloud 210. The engineer can thereby detect the software bug that caused the erroneous control. The engineer can, in this case, modify the software and use the engineering system 200 to execute the processing from step S12 of FIG. 5 onwards to create software in which the bug is fixed. This software in which the bug is fixed is, for example, downloaded from the engineering tool 211 to the control device 201 while the plant is suspended. The software is then used to control the controlled devices 205. An occurrence of erroneous control, for example, therefore need not be addressed at the site.

In this way, the engineering system 200 according to the present embodiment allows actual data to be used to debug software on the digital twin 212. The engineering system 200 allows debugging using not only simulated input but also actual data on the control device 201 that actually uses the software. The engineering system 200 therefore allows debugging that is more appropriate for the actual use environment. In other words, debugging with greater reproducibility can be performed. The engineering system 200 thereby allows creation of software that is more appropriate for the control device 201. In this way, the engineering system 200 can provide high-quality engineering.

The engineering system 200 according to the present embodiment also enables engineering on the cloud 210. Specifically, software is created with the engineering tool 211 on the cloud 210. The engineering system 200 according to the present embodiment therefore does not require an EWS to be managed and maintained, as do the engineering systems described with reference to FIGS. 1 to 3.

When new software is to be installed on the control device 201, software created with the engineering tool 211 on the cloud 210 can be downloaded onto the control device 201 after being thoroughly debugged using the digital twin 212. Erroneous operation after the installation of new software, for example, can there be avoided more easily.

Figure 6:
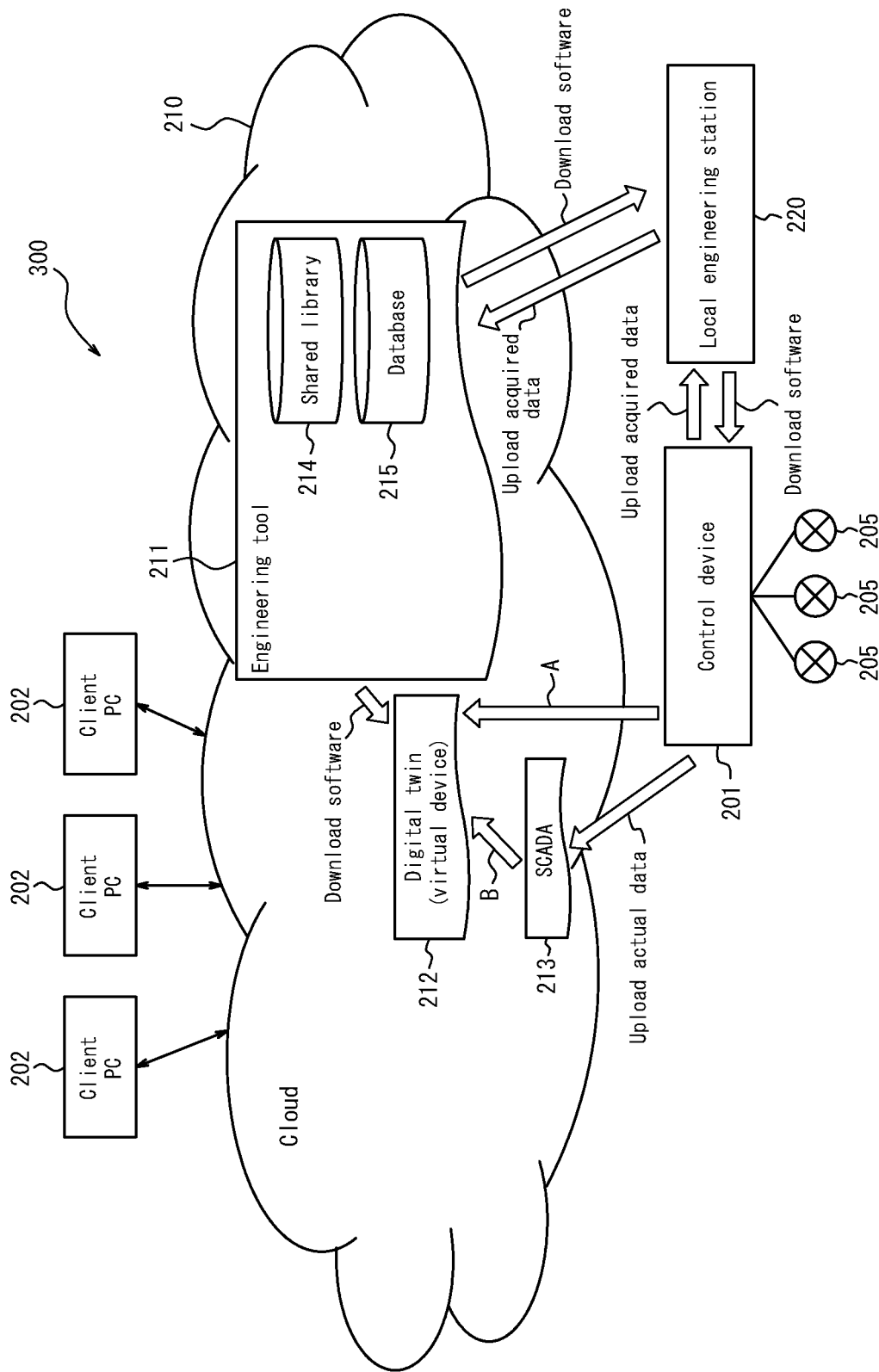
FIG. 6 is a schematic diagram illustrating a modification to the engineering system according to the first embodiment.

FIG. 6 is a schematic diagram illustrating a modification to the engineering system according to the first embodiment. The same reference signs are used in the engineering system 300 illustrated in FIG. 6 for elements similar to the engineering system 200 illustrated in FIG. 4.

In addition to the constituent elements of the engineering system 200 illustrated in FIG. 4, the engineering system 300 illustrated in FIG. 6 further includes a local engineering station 220. The local engineering station 220 is, for example, configured by a personal computer or the like. The local engineering station 220 acts as an intermediary for communication between the control device 201 and the engineering tool 211 on the cloud 210. In other words, the control device 201 does not upload acquired data to the engineering tool 211, but rather to the local engineering station 220 in the engineering system 300. The local engineering station 220 uploads the acquired data acquired from the control device 201 to the engineering tool 211. The engineering tool 211 downloads the debugged software to the local engineering station 220. The software is, for example, stored in memory of the local engineering station 220. The software stored in memory is downloaded from the local engineering station 220 onto the control device 201 while the plant is suspended, for example. The engineering method executed by the engineering system 300 may be similar to the method described with reference to FIG. 5.

When communication passes through the local engineering station 220 in this way, the engineering tool 211 can, for example, download the created software onto the local engineering station 220 regardless of whether the plant is suspended. The local engineering station 220 can, for example, store the software in memory until the plant is suspended and then download the software onto the control device 201 while the plant is suspended. Furthermore, when the engineering tool 211 cannot communicate directly with the control device 201 for technical reasons, for example, the engineering system 300 illustrated in FIG. 6 can be used to download the software onto the control device 201 and is therefore useful.

Second Embodiment

Figure 7:
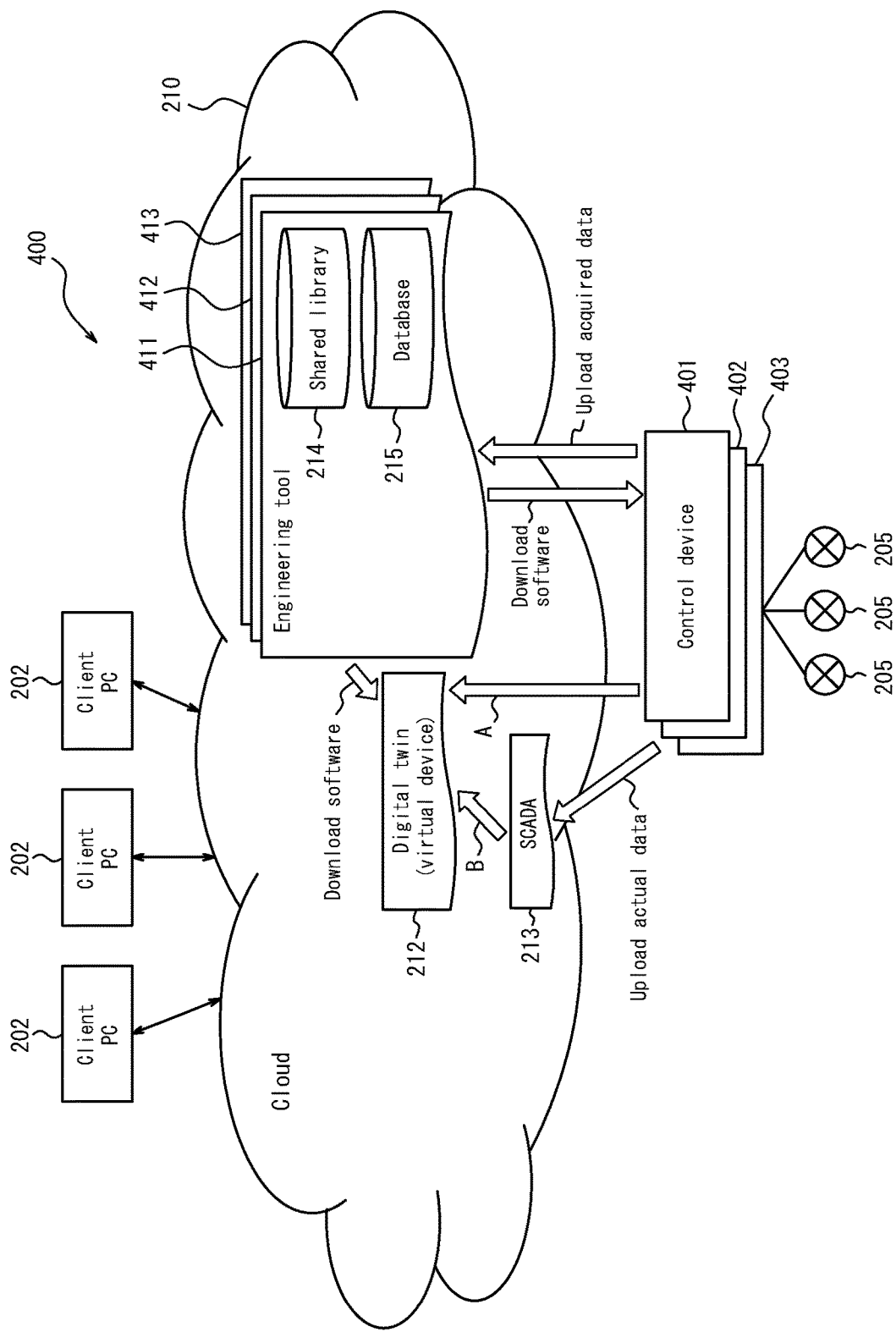
FIG. 7 is a schematic diagram illustrating an example engineering system according to a second embodiment.

FIG. 7 is a schematic diagram illustrating an example engineering system according to a second embodiment. The engineering system 400 according to the second embodiment is an example of a distributed engineering system. The same reference signs are used in the engineering system 400 illustrated in FIG. 7 for elements similar to the engineering system 200 illustrated in FIG. 4.

The engineering system 400 according to the present embodiment includes a plurality of control devices. In the example in FIG. 7, the engineering system 400 includes three control devices 401, 402, 403. The three control devices 401, 402, 403 each control a plurality of controlled devices 205. The plurality of controlled devices 205 controlled by the respective control devices 401, 402, 403 may be the same in the distributed engineering system 400. The content of control by the three control devices 401, 402, 403, however, may differ. In other words, the three control devices 401, 402, 403 may each perform different control on equipment that includes the plurality of controlled devices 205 capable of providing the same functions.

The engineering system 400 according to the present embodiment includes three engineering tools 411, 412, 413 on the cloud 210. The engineering tool 411 creates software to be executed on the control device 401, the engineering tool 412 creates software to be executed on the control device 402, and the engineering tool 413 creates software to be executed on the control device 403. The engineering tools 411, 412, 413 each have the same functions as the engineering tool 211 described with reference to FIG. 4. Accordingly, the engineering tools 411, 412, 413 each execute software creation processing based on signals acquired from the client PCs 202. The software created by the engineering tools 411, 412, 413 is downloaded onto the respective control devices 401, 402, 403 and executed. In other words, the engineering system 400 according to the present embodiment includes two or more pairs of a control device and an engineering tool in one-to-one correspondence. The engineering method executed by the engineering system 400 may be the same as the method described with reference to FIG. 5, except that the engineering tools 411, 412, 413 correspond to the respective control devices 401, 402, 403.

With this configuration, the distributed engineering system 400 according to the present embodiment can also achieve effects similar to those of the engineering system 200 described in the first embodiment.

Figure 8:
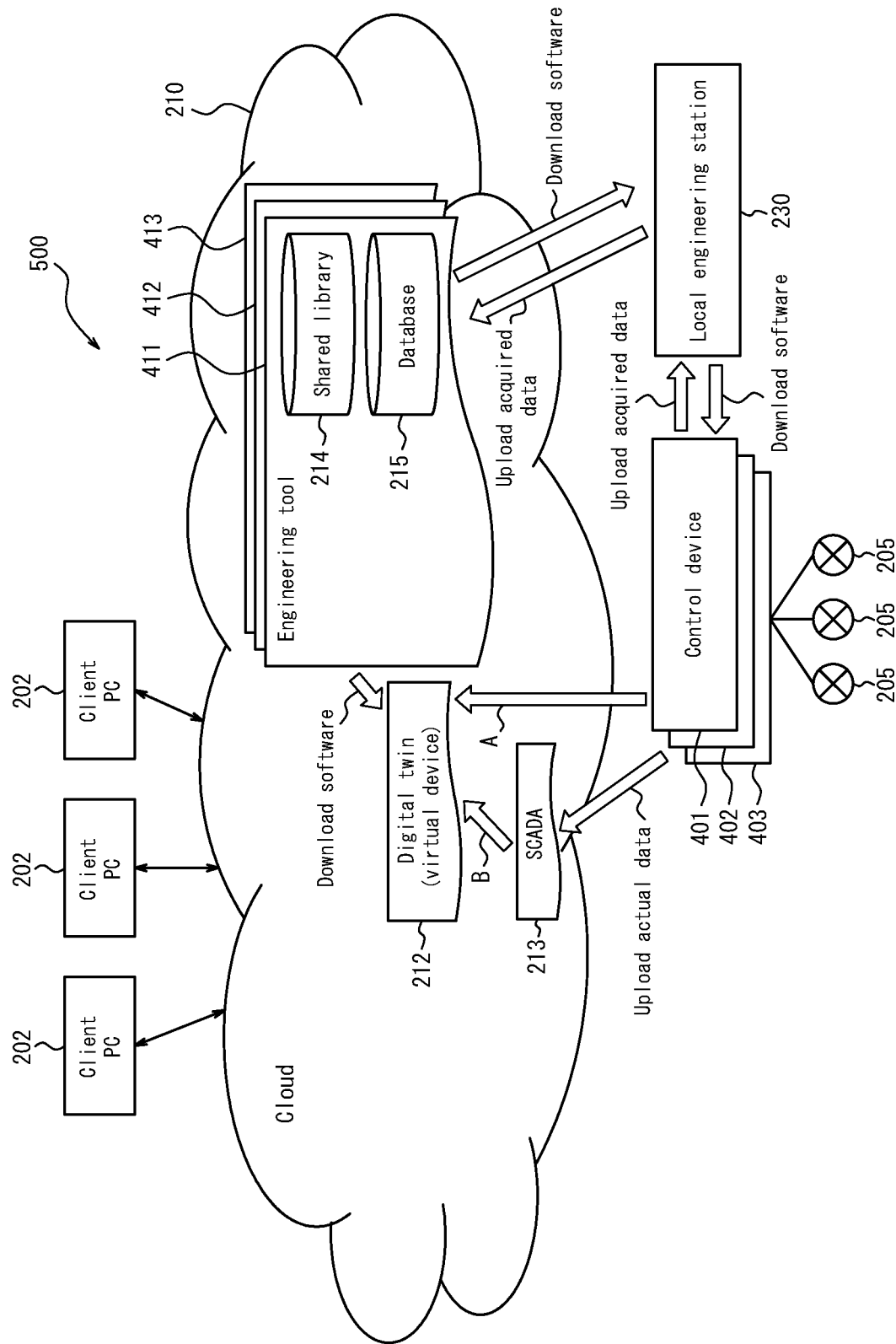
FIG. 8 is a schematic diagram illustrating a modification to the engineering system according to the second embodiment.

FIG. 8 is a schematic diagram illustrating a modification to the engineering system according to the second embodiment. The same reference signs are used in the engineering system 500 illustrated in FIG. 8 for elements similar to the engineering system 400 illustrated in FIG. 7.

In addition to the constituent elements of the engineering system 400 illustrated in FIG. 7, the engineering system 500 illustrated in FIG. 8 further includes a local engineering station 230. The functions and configuration of the local engineering station 230 may be the same as those of the local engineering station 220 described with reference to FIG. 6. In other words, the local engineering station 230 acts as an intermediary for communication between the control devices 401, 402, 403 and the engineering tools 411, 412, 413 on the cloud 210. Accordingly, the control devices 401, 402, 403 do not upload acquired data to the engineering tools 411, 412, 413 but rather to the local engineering station 230 in the engineering system 500. The local engineering station 230 uploads the acquired data acquired from the control devices 401, 402, 403 to the corresponding engineering tools 411, 412, 413. The engineering tools 411, 412, 413 download the debugged software to the local engineering station 230. The software is, for example, stored in memory of the local engineering station 230. The software stored in memory is downloaded from the local engineering station 230 onto the corresponding control devices 401, 402, 403 while the plant is suspended, for example. The engineering method executed by the engineering system 500 may be similar to the method described with reference to FIG. 7.

When communication passes through the local engineering station 230 in this way, the engineering tools 411, 412, 413 can, for example, download the created software onto the local engineering station 230 regardless of whether the plant is suspended. The local engineering station 230 can, for example, store the software in memory until the plant is suspended and then download the software onto the control devices 401, 402, 403 while the plant is suspended.

The present disclosure is not limited to the configurations specified in the above embodiments, and a variety of modifications may be made without departing from the scope of the claims. For example, the functions and the like included in the various components and steps may be reconfigured in any logically consistent way. Furthermore, components or steps may be combined into one or divided.

The invention claimed is:

1. An engineering system comprising:
a cloud comprising:
an engineering tool configured to create and debug software for operating a control device that controls a field device installed in a plant; and
a virtual device configured to download the software created and debugged by the engineering tool and simulate an operation state of the control device in accordance with the downloaded software and with actual data related to a control state of the controlled field device transmitted from the control device in real time; and
a local engineering station configured to intermediate communication between the control device and the engineering tool,
wherein the local engineering station comprises a memory,
wherein the engineering tool debugs the downloaded software on the virtual device by comparing an operation result yielded by the simulation of the operation state of the control device in the virtual device and the actual data related to the control state of the controlled field device transmitted from the control device in real time,
wherein the debugged software is downloaded from the engineering tool to the local engineering station and stored in the memory of the local engineering station when the engineering tool finishes debugging the downloaded software on the virtual device,
wherein the debugged software stored in the memory of the local engineering station is downloaded from the local engineering station onto the control device while the plant is suspended and/or when the engineering tool cannot communicate directly with the control device,
wherein the cloud comprises a server and a storage device, and
wherein the server and the storage device are configured to implement the engineering tool and the virtual device.

2. The engineering system of claim 1, further comprising two or more pairs of the control device and the engineering tool.

3. The engineering system of claim 1, wherein the actual data related to the control state of the controlled field device includes:
data sent from the controlled field device and inputted to the control device, and
information related to a signal outputted from the control device to the controlled field device.

4. An engineering method to be executed by an engineering system comprising a cloud that includes an engineering tool and a virtual device, and a local engineering station comprising a memory, the engineering method comprising:
creating and debugging software, using the engineering tool, for operating a control device that controls a field device installed in a plant; and
downloading the software created and debugged by the engineering tool, using the virtual device, and simulating an operation state of the control device in accordance with the downloaded software and with actual data related to a control state of the controlled field device transmitted from the control device in real time,
wherein the local engineering station is configured to intermediate communication between the control device and the engineering tool,
wherein the engineering tool debugs the downloaded software on the virtual device by comparing an operation result yielded by the simulation of the operation state of the control device in the virtual device and the actual data related to the control state of the controlled field device transmitted from the control device in real time,
wherein the debugged software is downloaded from the engineering tool to the local engineering station and stored in the memory of the local engineering station when the engineering tool finishes debugging the downloaded software on the virtual device, and
wherein the debugged software stored in the memory of the local engineering station is downloaded from the local engineering station onto the control device while the plant is suspended and/or when the engineering tool cannot communicate directly with the control device.

5. The engineering method of claim 4, wherein the actual data related to the control state of the controlled field device includes:

data sent from the controlled field device and inputted to the control device, and information related to a signal outputted from the control device to the controlled field device.

6. The engineering method of claim 4, wherein the engineering system further comprises two or more pairs of the control device and the engineering tool.

* * * * *